Figure 1:
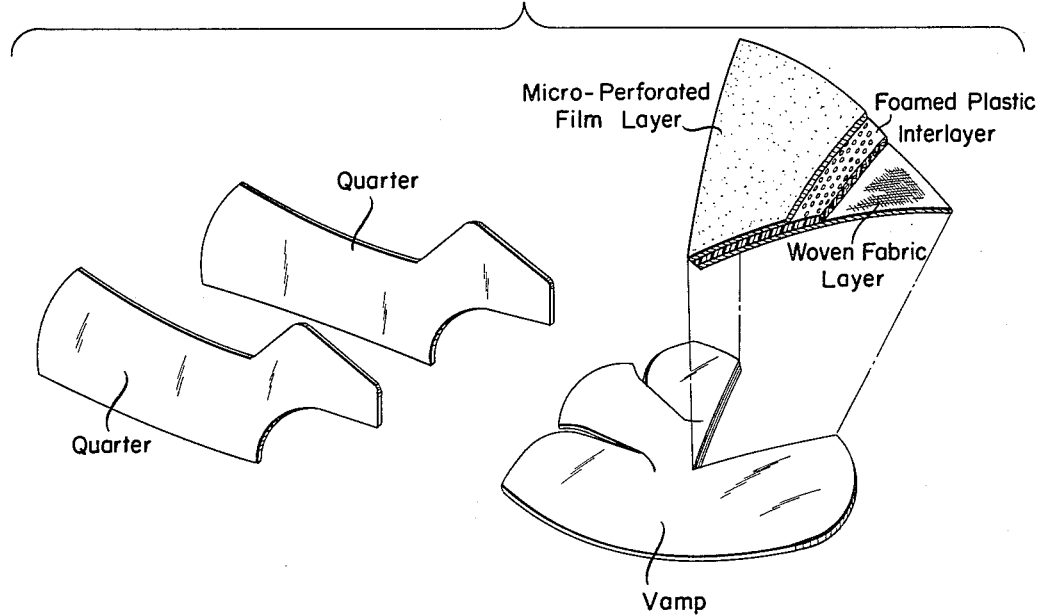

April 28, 1964     I. I. MARKEVITCH     3,130,505
ANTI-FUNGAL SHOE UPPERS
Filed Dec. 7, 1961

INVENTOR
Igor I. Markevitch

BY *Moore & Quaintance*

ATTORNEYS

United States Patent Office 3,130,505
Patented Apr. 28, 1964

3,130,505
ANTI-FUNGAL SHOE UPPERS
Igor I. Markevitch, Pompton Lakes, N.J., assignor to Arnav Industries, Inc., Little Ferry, N.J., a corporation of Delaware
Filed Dec. 7, 1961, Ser. No. 157,647
3 Claims. (Cl. 36—45)

This invention relates to new and improved shoes, and especially to new and useful anti-fungal shoe uppers.

As is well known, many persons have difficulty with excessive foot perspiration. Apart from the resulting discomfort induced by the sweating foot, the moist warm environment created in the shoe is especially conducive to putrefactive conditions and to bacterial and fungal growth and, as a result, many persons develop so-called "athlete's foot." Thus the efforts to alleviate, or solve, the resulting problem has been directed towards creating an antiseptic and therapeutic environment for the foot and a media for the adsorption of moisture. It has been felt that the solution of the problem is best approached by the use of an appropriate innersole, or insole.

It has now been found that the problem cannot be solved satisfactorily by the limited approach heretofore used. This is especially true where synthetic polymeric materials are used in the making of shoes which constitute the cheapest kind of shoes. Also, the problem is especially acute in tropical regions where the large majority of economically depressed people live and inexpensive shoes are most needed. For instance, both bacteria and fungi thrive in the hot and humid climates normally encountered in tropical regions.

For the reasons given, and for other reasons, it has now been found that it is very important to incorporate anti-fungal (which is to be interpreted to include anti-mildew), and preferably anti-fungal and anti-bacterial compositions together with medicaments, if desired, in shoe uppers and especially in uppers made of so-called synthetic plastics, i.e., flexible and elastomeric polymeric materials. It will be understood that "anti-fungal" and the like is used herein to be inclusive of both fungistats and fungicides. The incorporation of such materials is particularly important where expanded cellular elastomeric polymeric materials are used due to the ease with which fungi and the like tend to destroy their cellular structure and due to the advantages of such construction of shoe uppers when shoes are to be used in tropical regions. Closed cell types of foamed plastics generally are preferred for use in shoe uppers, but open cell foamed plastics may be used also. Due to the bellows-like structure of shoes made of foamed plastics, the incorporation of antiseptic ingredients in such shoe uppers assist importantly in maintaining foot hygiene where the uppers are micro-perforated. While certain elastomeric polymeric materials are considered highly resistant to fungi, it must be realized that shoe uppers normally contain cloth inner-linings which provide a haven for fungi and the like.

Due to the special applicability of the present invention to foamed plastic uppers, it has been practiced with such materials. The particular shoe upper was made from a micro-perforated laminated sheet material. The sheet was of a thickness suitable for use as shoe uppers, had a relatively thin outer polyvinyl chloride film layer, having the texture and appearance of leather, an inner cloth layer, forming the lining of the shoe, and a foamed polyvinyl chloride interlayer. Methods for forming such laminar sheet material are known and no not constitute a part of this invention. It should be emphasized, however, the sheet material must be micro-perforated after it is formed if it is to serve satisfactorily as a shoe upper. The object of the perforation is to permit air and water vapor to pass through the shoe upper, especially from the foot outward, while inhibiting, or prohibiting, the passage of water from the outside to the inside of the shoe. A manner of achieving this result is disclosed in a co-pending application Serial No. 154,969, entitled "Shoe Uppers," filed on November 27, 1961, and assigned to a common assignee.

It has been found that anti-fungal agents are most advantageously incorporated in the formulations used in the production of the film lamina and the foamed plastic interlayer of the laminated sheet material. The agents may be used to impregnate the fabric lining before, or after, it is incorporated in the sheet material. While important advantages of the invention are obtained by incorporating the anti-fungal agent in the foamed interlayer only, it is advantageous to incorporate such materials in all the lamina.

It will be apparent the amount of anti-fungal and like agents used will be related to their potency and stability. For illustrative purposes the sheet material mentioned above as being used for shoe uppers was formulated with anti-fungal and anti-bacterial agents which were heat stable, which may be important in the production of the sheet material, and light stable which is important in the use of the shoe uppers. The anti-fungal agent was a broad spectrum fungistat, namely, 5,6-dichlorobenzoxazolinone-2 and the bacteriostat was compatible tetrachlorosalicylanilide. Both of these ingredients were effective, and not detrimental, when incorporated in about 0.1 to 0.2%. Somewhat higher percentages should be used in the cloth lining, say 0.25%. Under very adverse conditions even higher percentages may advantageously be used, even up to 1.0%. Directions for effective amounts are available from the producers.

The formulations set out below have been found effective in the production of surface film and foamed interlayers for shoe uppers in which parts, not otherwise expressed, are expressed in parts by weight.

Film

| | |
|---|---|
| Straight polyvinyl chloride resin | 100 |
| Polymeric plasticizer (neopentyl glycol) derivative | 85 |
| Di-2-ethyl hexyl phthalate | 15 |
| Organic phosphate | 5 |
| Dialic, i.e., $C_6H_4(COOCH_2CH=CH_2)_2$ | 1.5 |

0.1 to 0.2% of each of the ingredients mentioned above.

Foam

| | |
|---|---|
| Straight polyvinyl chloride resin | 100 |
| Polymeric plasticizer (neopentyl glycol) derivative | 85 |
| Di-2-ethyl hexyl phthalate | 15 |
| Organic phosphate | 5 |
| Dialic, i.e., $C_6H_4(COOCH_2CH=CH_2)_2$ | 1.5 |
| Azo-bis-formamide, i.e., $H_2N$—CO—N=N—$CONH_2$ | 2% |

0.1 to 0.2% of each of the ingredients mentioned above.

The fabric side of the sheet material was placed in contact with an aqueous media containing the fungistat and the bacteriostat mentioned above in concentrations which left desired concentrations on the cloth after the water was evaporated.

The accompanying perspective drawing with appropriat legends shows representative shoe uppers.

Figure 2:
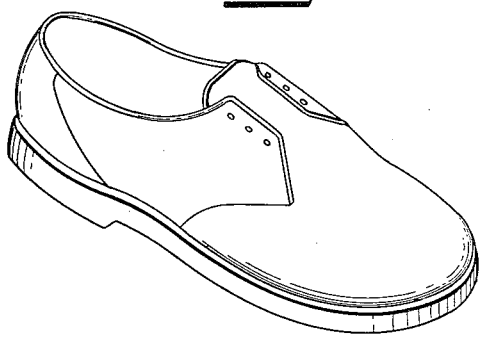

In the drawing:

FIG. 1 represents a view of the vamp and quarters of a three part upper stamped from the sheet material described above with an exploded section showing the micro-perforations and the cellular structure; and FIG. 2 represents a view of a child's shoe made from the uppers of FIG. 1.

While the invention has been described in considerable detail, it will be realized the details are included for illustrative purposes and that the invention is not limited to these details for many other anti-fungal and kindred ingredients in effective amounts may be incorporated in the shoe uppers without departing from the spirit of the invention or the scope thereof as defined in the appended claims.

What is claimed is:

1. A micro-perforated shoe upper comprising a shoe upper provided with an outer lamina of a micro-perforated synthetic elastomeric polymeric film, an inner surface lamina of cloth, and an interlamina of a micro-perforated synthetic expanded cellular elastomeric polymeric material having encompassed therein effective amounts of anti-fungal agent and an anti-bacterial agent.

2. A micro-perforated shoe upper comprising an outer surface lamina of a micro-perforated synthetic elastomeric polymeric film, an inner surface lamina of cloth, and an interlamina of micro-perforated cellular synthetic elastomic polymeric material, each of said lamina containing an effective amount of an anti-fungal agent.

3. The shoe upper of claim 2 wherein the film and the interlamina both are vinyl chloride polymers.

References Cited in the file of this patent

UNITED STATES PATENTS

| | | |
|---|---|---|
| 2,077,514 | Callahan | Apr. 20, 1937 |
| 2,651,854 | Taber et al. | Sept. 15, 1953 |
| 2,724,676 | Randall et al. | Nov. 22, 1955 |
| 2,838,045 | Ryznar | June 10, 1958 |
| 2,869,253 | Sachs | Jan. 20, 1959 |
| 2,911,973 | Chieffo | Nov. 10, 1959 |
| 3,024,786 | Fuzak | Mar. 13, 1962 |